United States Patent
Deshmukh et al.

(10) Patent No.: US 12,041,053 B2
(45) Date of Patent: Jul. 16, 2024

(54) GRANULAR SAAS TENANT RESTRICTION SYSTEMS AND METHODS

(71) Applicant: Zscaler, Inc., San Jose, CA (US)

(72) Inventors: Pooja Deshmukh, Sunnyvale, CA (US); Narinder Paul, Sunnyvale, CA (US); Naresh Kumar, San Jose, CA (US); Santhosh Kumar, Bengaluru (IN); Sravani Manukonda, Bengaluru (IN); Vijay Bulusu, Fremont, CA (US)

(73) Assignee: Zscaler, Inc., San Jose, CA (US)

( * ) Notice: Subject to any disclaimer, the term of this patent is extended or adjusted under 35 U.S.C. 154(b) by 184 days.

(21) Appl. No.: 17/102,688

(22) Filed: Nov. 24, 2020

(65) Prior Publication Data
US 2022/0116397 A1    Apr. 14, 2022

(30) Foreign Application Priority Data
Oct. 12, 2020    (IN) .............................. 202011044308

(51) Int. Cl.
*G06F 21/00*    (2013.01)
*G06F 21/62*    (2013.01)
*H04L 9/40*    (2022.01)

(52) U.S. Cl.
CPC .......... *H04L 63/102* (2013.01); *G06F 21/629* (2013.01); *H04L 63/1425* (2013.01)

(58) Field of Classification Search
CPC ............... H04L 63/102; H04L 63/1425; H04L 63/0263; G06F 21/629
See application file for complete search history.

(56) References Cited

U.S. PATENT DOCUMENTS

| | | | |
|---|---|---|---|
| 8,185,510 B2 | 5/2012 | Chaudhry et al. | |
| 8,429,111 B1 | 4/2013 | Kailash et al. | |
| 8,869,259 B1 | 10/2014 | Udupa et al. | |
| 8,887,249 B1 | 11/2014 | Schekochikhin et al. | |
| 9,152,789 B2 | 10/2015 | Natarajan et al. | |
| 9,154,475 B1 | 10/2015 | Kailash et al. | |
| 9,473,537 B2 | 10/2016 | Sinha et al. | |
| 9,609,015 B2 | 3/2017 | Natarajan et al. | |
| 10,079,831 B1* | 9/2018 | Totale | G06F 21/604 |
| 10,523,710 B2 | 12/2019 | Sinha et al. | |
| 11,003,798 B1* | 5/2021 | Mhaske | G06F 21/629 |
| 2014/0173694 A1* | 6/2014 | Kranz | H04L 63/10 726/4 |
| 2015/0188779 A1* | 7/2015 | McCanne | H04L 63/10 709/223 |
| 2016/0255117 A1* | 9/2016 | Sinha | H04L 12/4641 726/1 |
| 2018/0067734 A1* | 3/2018 | Prasad | G06F 11/3438 |
| 2019/0068627 A1* | 2/2019 | Thampy | H04W 12/12 |
| 2019/0318100 A1* | 10/2019 | Bhatia | G06F 21/57 |

(Continued)

*Primary Examiner* — Michael M Lee
(74) *Attorney, Agent, or Firm* — Baratta Law PLLC; Lawrence A. Baratta, Jr.; Ryan Odessa

(57) ABSTRACT

Systems and methods include obtaining a profile for an application, wherein the profile includes one or more tenants, rules for use of the application by the one or more tenants, and users for the rules; monitoring a user of a tenant of the one or more tenants inline via a node in a cloud-based system; identifying an application of the one or more applications based on the monitoring and associated rules for the user; and enforcing the associated rules for the user for the application.

20 Claims, 10 Drawing Sheets

(56) References Cited

U.S. PATENT DOCUMENTS

| | | | |
|---|---|---|---|
| 2019/0342315 A1* | 11/2019 | Smelov | H04L 63/20 |
| 2020/0128047 A1* | 4/2020 | Biswas | H04L 67/10 |
| 2020/0213360 A1* | 7/2020 | Ojha | H04L 45/24 |
| 2020/0236114 A1* | 7/2020 | Patil | G06F 21/31 |
| 2020/0322453 A1* | 10/2020 | Said | H04L 67/1097 |
| 2021/0303363 A1* | 9/2021 | Li | G06F 16/9024 |

* cited by examiner

Tenant Profiles

◇ Add Tenant Profile

| | Profile Name | Cloud Application | | Details | Description | | |
|---|---|---|---|---|---|---|---|
| | Marketing Dropbox Accounts | Dropbox | | TEAM ID<br>48763932<br>48763932 | Restrict marketing dropbox data | ✎ ⊕ | ✕ |
| | People and Ops Slack Accounts | Slack | | WORKSPACE ID<br>T2DC3J9AA | Lorem ipsum dolor sit amet | ✎ ⊕ | ✕ |
| | Engineering Box Accounts | Box | | DOMAIN<br>companyname.ent.box.com | Lorem ipsum dolor sit amet | ✎ ⊕ | ✕ |
| | HQ Facebook Accounts | Facebook | | DOMAIN<br>https://www.facebook.com/workplace | Lorem ipsum dolor sit amet | ✎ ⊕ | ✕ |
| | Finance Google Accounts | Google | | DOMAIN<br>companyname.net | Lorem ipsum dolor sit amet | ✎ ⊕ | ✕ |
| | Marketing YouTube Accounts | YouTube | | CHANNEL ID<br>UCYxagwHTcYzipNwLGARvPig<br>UCZkmTcYzipNwLGARvPigq | Lorem ipsum dolor sit amet | ✎ ⊕ | ✕ |
| | YouTube Gaming and Sports | YouTube | | CATEGORY<br>Gaming, Sport | Lorem ipsum dolor sit amet | ✎ ⊕ | ✕ |
| | YouTube School Filters | YouTube | | SCHOOL ID<br>UCYxagwHTcYzipNwLGARvPig<br>UCZkmTcYzipNwLGARvPigq | Lorem ipsum dolor sit amet | ✎ ⊕ | ✕ |
| | Office 365 Tenants | Office 365 | | TENANT<br>corp1.safemarsh.com<br>corp2.safemarsh.com<br>TENANT DIRECTORY<br>f4c77d84-6bb8-41a2-a3c9-68dd3ec3a158 | Lorem ipsum dolor sit amet | ✎ ⊕ | ✕ |

GRANULAR SAAS TENANT RESTRICTION SYSTEMS AND METHODS

FIELD OF THE DISCLOSURE

The present disclosure relates generally to networking and computing. More particularly, the present disclosure relates to granular Software-as-a-Service (SaaS) tenant restriction systems and methods.

BACKGROUND OF THE DISCLOSURE

Traditionally, before the cloud, corporate or enterprise resources were fully under the control of Information Technology (IT) administration ("admins"). That is, sensitive enterprise data was located within a network under IT admin control with perimeter defenses. Here, IT admins have full control of access privileges, activity, etc. As is well-known, enterprises are moving their IT infrastructure to the cloud for a variety of cloud services (Software-as-a-Service (SaaS)) for email (e.g., Office 365, Gmail, etc.), file storage (OneDrive, Dropbox, Box, Google Drive, SharePoint, etc.), document preparation and content collaboration (e.g., Office 365, Google Docs, etc.), Customer Relationship Management (CRM) (e.g., Salesforce, etc.), and the like. Here, enterprise IT admins no longer have the same level of control of enterprise resources, i.e., content is stored in the cloud, and IT simply does not have the same level of control as before.

Often, organizations cannot implement a blanket yes/any access control to sanctioned or unsanctioned applications. Any existing solution (including cloud security SaaS service) relies on a global allow list or block list configuration, allowing unauthorized users to access enterprise resources necessary beyond their job functions. From an information security perspective, there is a need to define zones/sub-applications within SaaS applications, necessary by a user to perform their job duties and be able to leverage these sub-application definitions across various access control policies.

BRIEF SUMMARY OF THE DISCLOSURE

The present disclosure relates to granular Software-as-a-Service (SaaS) tenant restriction systems and methods. Specifically, the tenant restriction is enforced through a cloud-based security system offering a security service. The present disclosure includes a framework that allows creating business process-specific sub-application within SaaS applications and provides granular criteria-based access control using these sub-application definitions. The sub-applications can be defined in various SaaS applications such as Office 365, Box, Dropbox, G Suite, Amazon Web Services (AWS), etc. The present disclosure can also define business authorization to consumer applications like Corporate YouTube Channels, YouTube Video Categories. The controls provide flexibility to tailor access to specific sub-sections within the applications based on the user's identity, role, and location, thereby providing granular tenancy restriction control over sanctioned and unsanctioned applications.

In various embodiments, the present disclosure includes a method that includes steps, a non-transitory computer readable medium with instructions that cause one or more processors to perform the steps, a cloud-based system configured to perform the steps, and a node configured to perform the steps. The steps include obtaining a profile for an application, wherein the profile includes one or more tenants, rules for use of the application by the one or more tenants, and users for the rules; monitoring a user of a tenant of the one or more tenants inline via a node in a cloud-based system; identifying an application of the one or more applications based on the monitoring and associated rules for the user; and enforcing the associated rules for the user for the application.

Traffic between the application and the node can include a header with information related to the application for the identifying. The node can be located between the user and the application, and wherein the identifying is based on a request from the user to the application monitored at the node and a response from the application to the user monitored at the node. The one or more applications can include Software-as-a-Service (SaaS) applications. The one or more applications can include a video sharing application, and wherein the associated rules include any of allowing or blocking channels and allowing or blocking content categories. The monitoring can be via a Cloud Access Security Broker (CASB) service implemented through the cloud-based system. The monitoring can include inspection of encrypted traffic. The tenant can be one of a plurality of tenants configured to operate with the cloud-based system, wherein, for a given application, the associated rules are different for at least two applications. The application can be a first application, and steps can include identifying a second application of the one or more applications based on the monitoring and associated rules for the user; and enforcing the associated rules for the user for the second application, wherein the associated rules for the second application are different from the associated rules for the first application.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

FIGS. 7-11 are screenshots associated with the granular SaaS tenant restriction process of FIG. 6, namely FIG. 7 is a screenshot of a dashboard illustrating various tenant profiles for different cloud applications, FIG. 8 is a screenshot of various windows for adding tenant profile rules, FIG. 9 is a screenshot of various windows for adding a file-sharing rule, and FIGS. 10 and 11 are screenshots of a window for a profile for YouTube.

DETAILED DESCRIPTION OF THE DISCLOSURE

Again, the present disclosure relates to granular Software-as-a-Service (SaaS) tenant restriction systems and methods.

Specifically, the tenant restriction is enforced through a cloud-based security system offering a security service. The present disclosure includes a framework that allows creating business process-specific sub-application within SaaS applications and provides granular criteria-based access control using these sub-application definitions. The sub-applications can be defined in various SaaS applications such as Office 365, Box, Dropbox, G Suite, Amazon Web Services (AWS), etc. The present disclosure can also define business authorization to consumer applications like Corporate YouTube Channels, YouTube Video Categories. The controls provide flexibility to tailor access to specific sub-sections within the applications based on the user's identity, role, and location, thereby providing granular tenancy restriction control over sanctioned and unsanctioned applications.

Cloud-Based System

Figure 1:
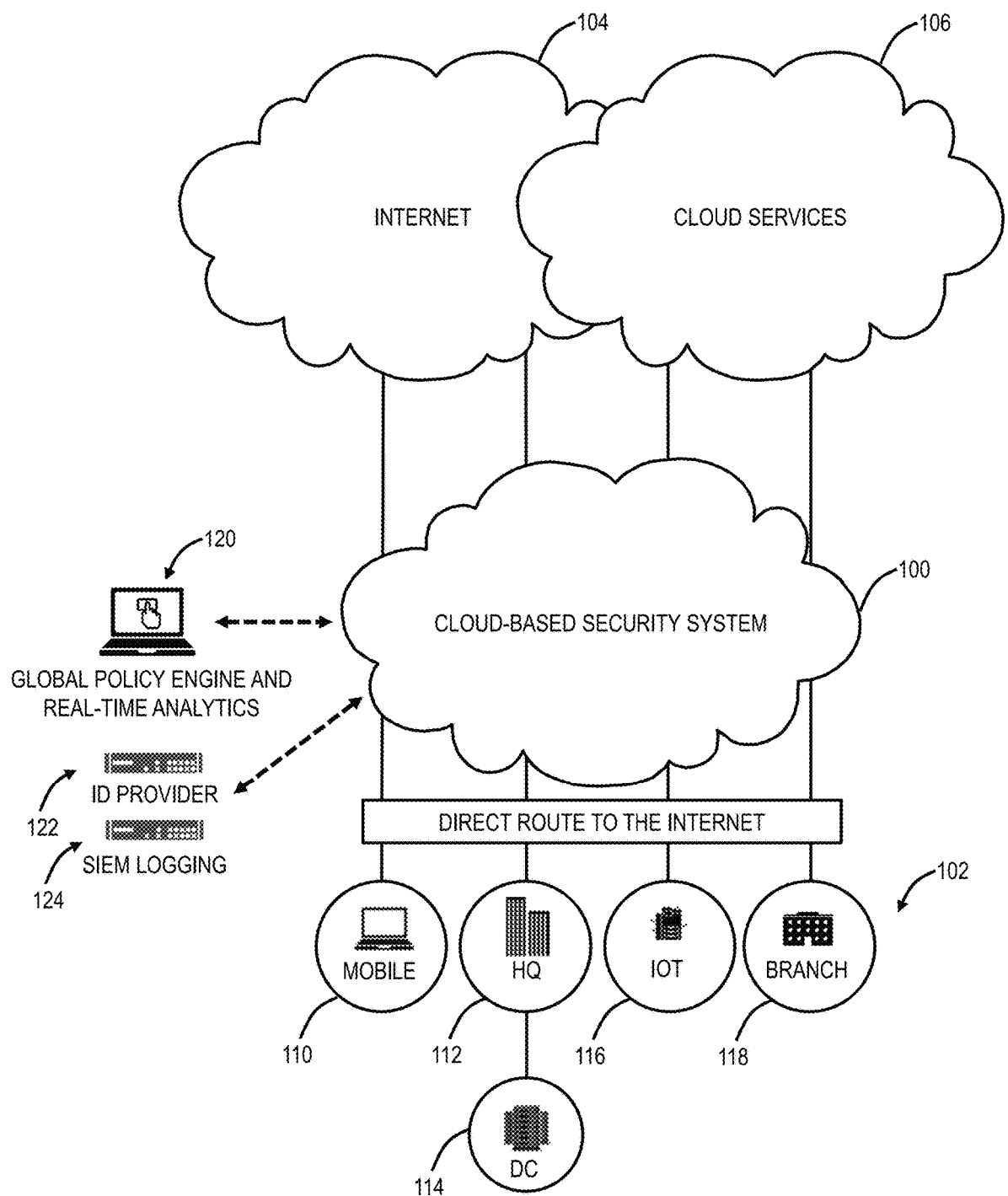
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102 and other cloud services. In this manner, the cloud-based system 100 is located between the users 102 and the Internet and any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
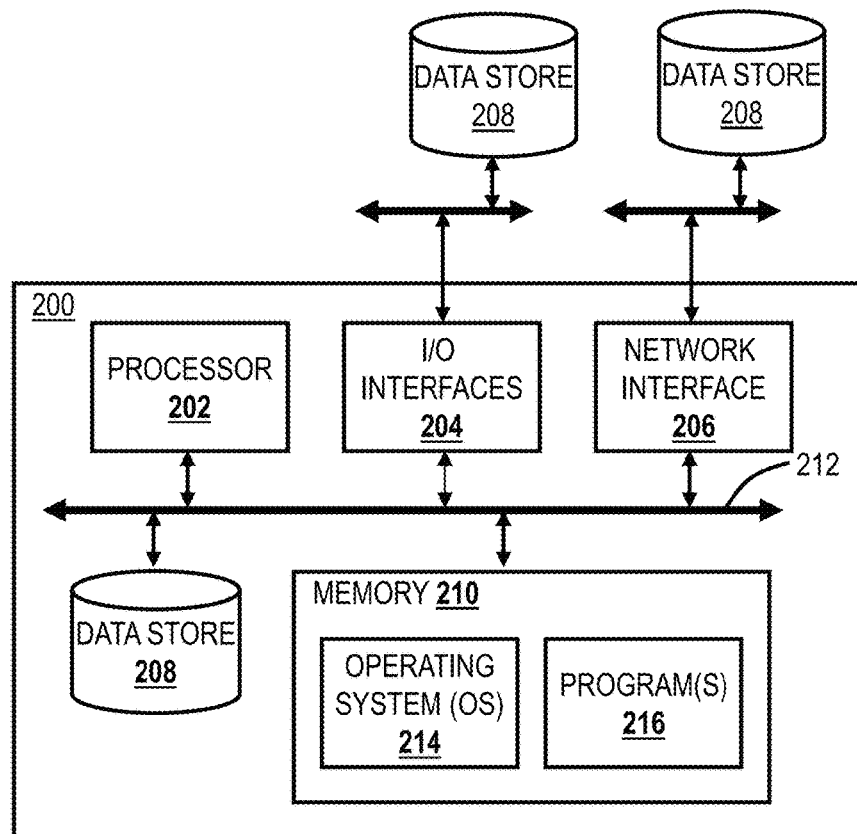

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
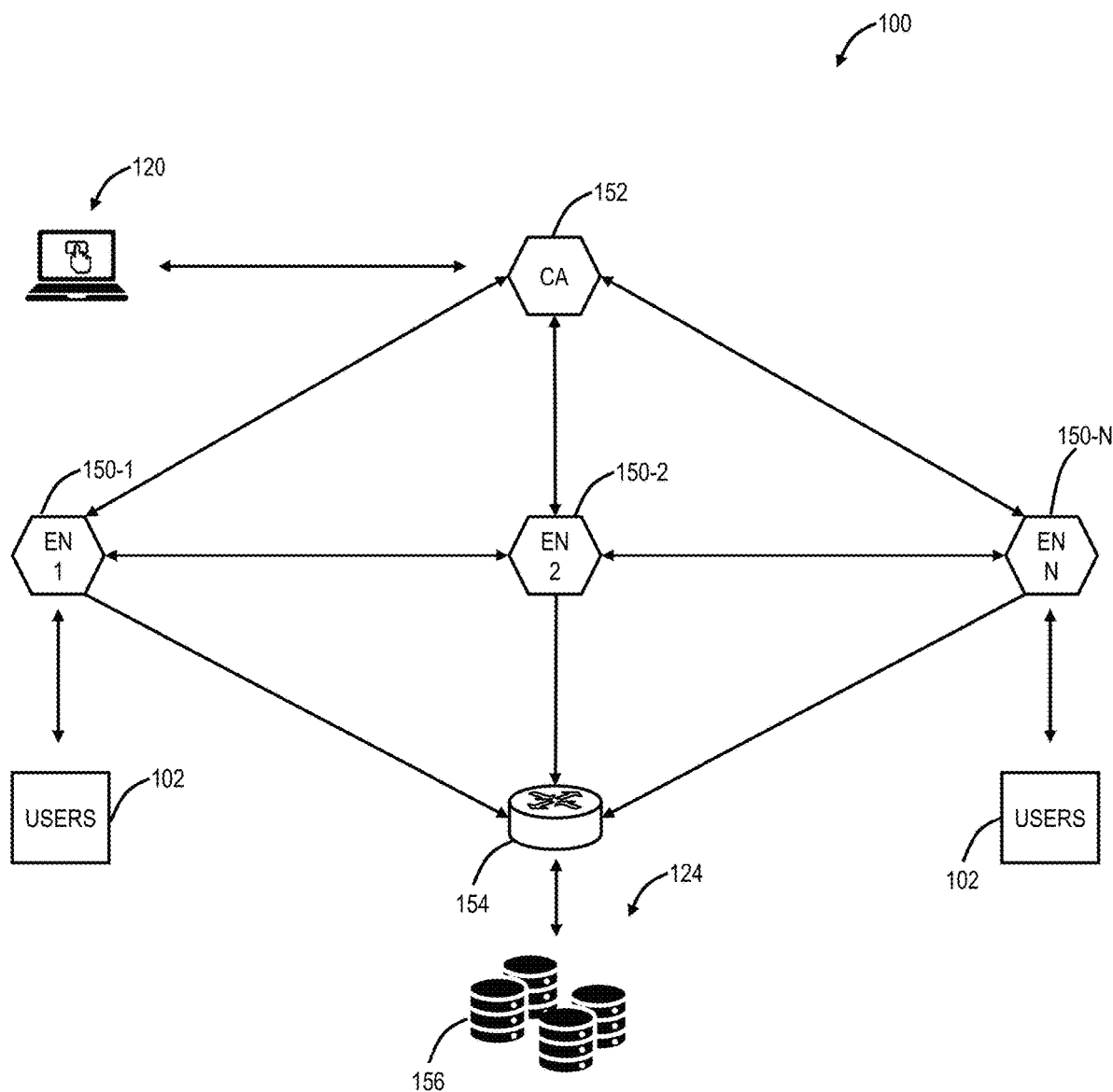
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet instead of being provided by a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or provide system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
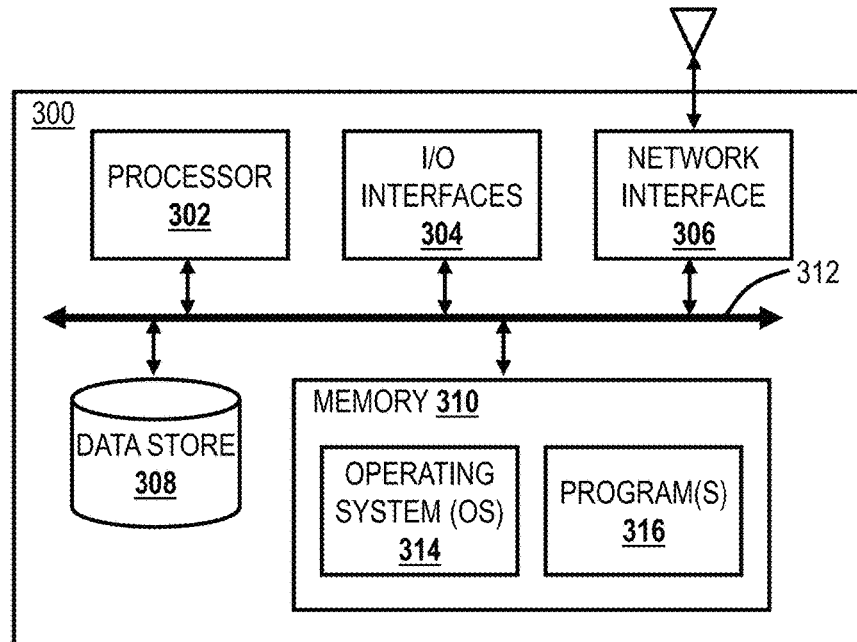

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
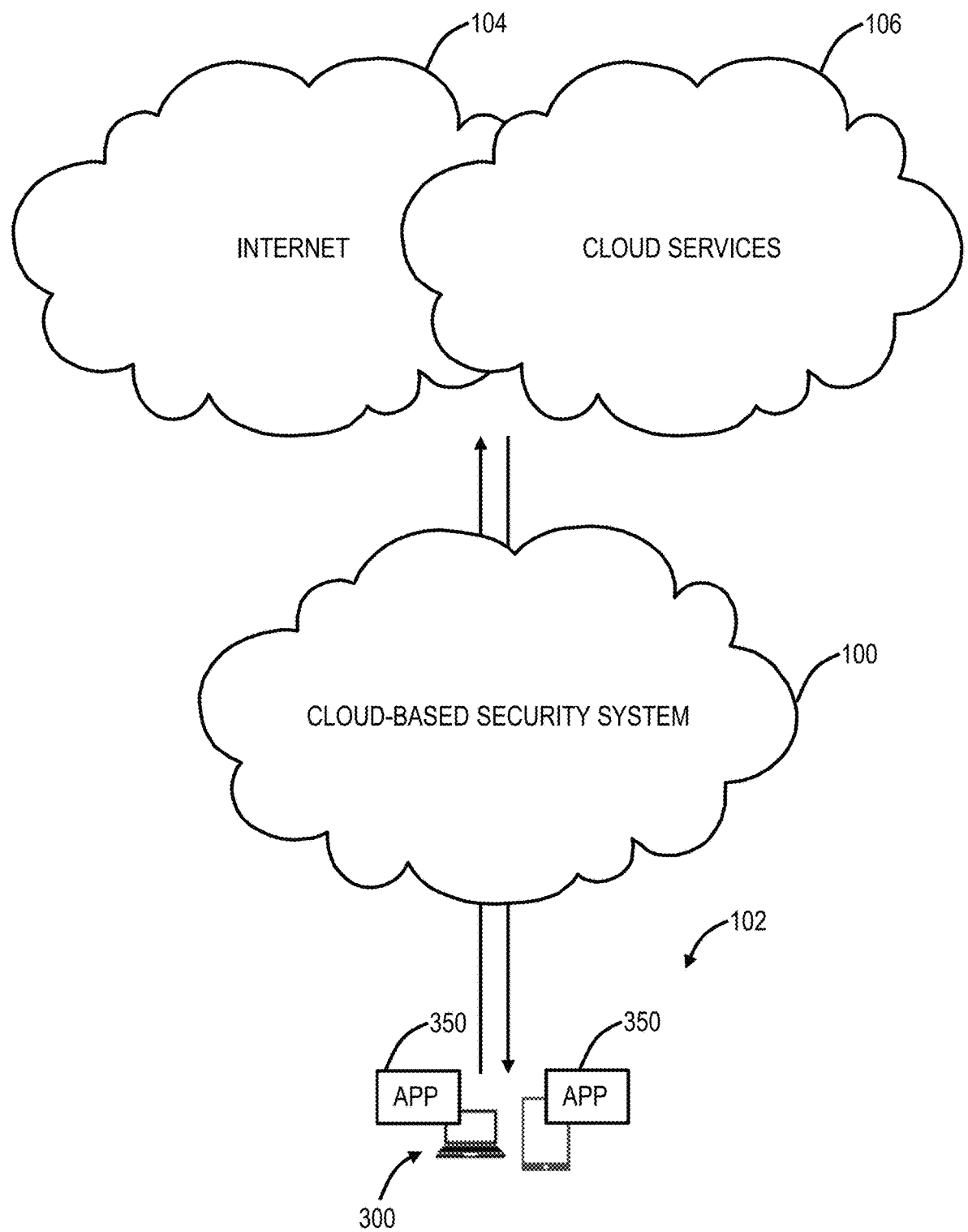
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 before accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

CASB

The cloud-based system 100 can be configured as an inline CASB to provide a cloud-based CASB service between the users 102 and cloud applications 106, i.e., the cloud application 106 that can also be referred to herein as SaaS applications or simply SaaS. The CASB is configured to monitor activity and enforce security policies, such as monitoring user activity, warning administrators about potentially hazardous actions, Data Loss Prevention (DLP), enforcing security policy compliance, automatically preventing malware, etc. For example, the CASB can scan through a large number of files in a cloud or SaaS application, e.g., Office 365, Dropbox, Box, Google Drive, Salesforce, etc. In effect, an objective of a CASB is to provide IT admin with control as if the enterprise resources were fully under the IT admin's control as before the cloud. Also, the cloud-based system 100, as a CASB and as an inline system between the users 102 and the cloud applications 106 can further implement tenancy restrictions, i.e., enforce user-level access restrictions. That is, the cloud-based system 100 can perform CASB functions of monitoring user activity, warning administrators about potentially hazardous actions, enforcing security policy compliance, and automatically preventing malware, as well as enforcing access to SaaS applications.

The cloud-based system 100 is a fully integrated cloud-based security stack that sits inline between the users 102 and the Internet 104 and the cloud applications 106, inspecting all traffic, including SSL, flowing between them. In addition to inline CASB capabilities for data in motion, the cloud-based system 100 offers out-of-band CASB capabilities for securing data at rest. The out-of-band CASB integration looks inside the SaaS applications themselves through API integrations to identify accidental or intentional data exposure and compliance violations that would otherwise go unnoticed. That is, in an embodiment, the cloud-based system 100 as a CASB is configured to operate as a distributed file crawler for files associated with a particular tenant. The CASB can both provide a report based on the file crawling as well as implement policy actions based on policy configuration. In the present disclosure, the cloud-based system 100 as a CASB is further configured to provide granular tenancy restriction control for SaaS. As described herein, granular means more than a simple allow or deny. That is, one approach to tenancy restriction is to simply allow or block a user 102 from a particular SaaS. This is no longer sufficient as tenants are moving their resources to SaaS applications. That is, the users 102 need to access Office 365 from Microsoft, G Suite from Google, YouTube, Slack, Box, Dropbox, and other SaaS applications, and it is not sufficient to block these applications.

Granular SaaS Tenant Restriction

Figure 6:
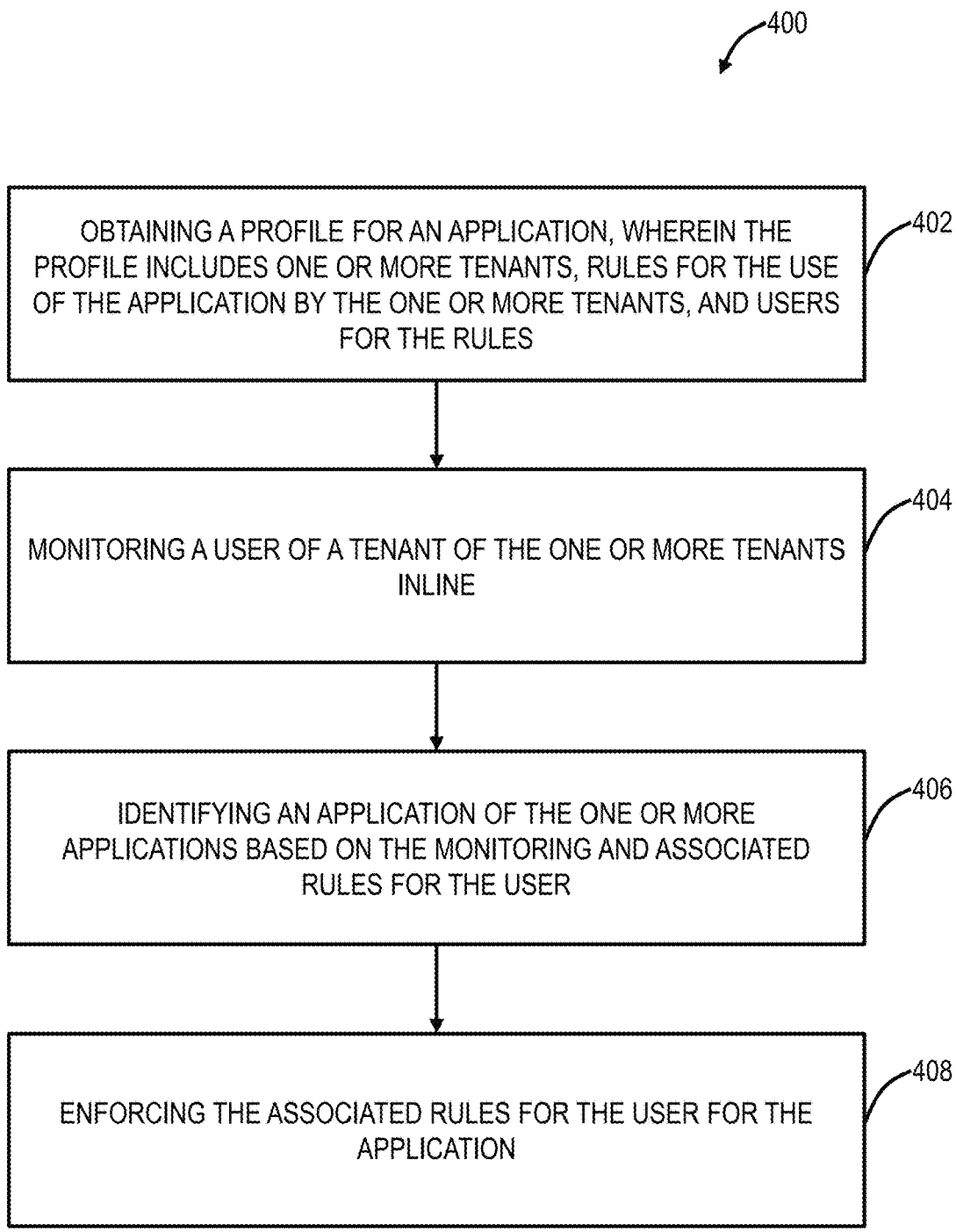
FIG. 6 is a flowchart of a granular SaaS tenant restriction process that may be implemented through the cloud-based system of FIGS. 1-2, acting as an inline CASB.

FIG. 6 is a flowchart of a granular SaaS tenant restriction process 400, which may be implemented through the cloud-based system 100, acting as an inline CASB. The granular SaaS tenant restriction process 400 can be implemented as a method with steps, a system including a cloud node, a Cloud Access Security Broker (CASB) system, a cloud-based system configured to implement the steps, a server configured to implement the steps, and/or a non-transitory computer-readable storage medium having computer-readable code stored thereon for programming one or more processors to perform the steps.

The granular SaaS tenant restriction process 400 can support multiple applications for multiple tenants. The granular SaaS tenant restriction process 400 supports granular tenancy restrictions for the multiple actions, i.e., more than simply allow or block. The multiple actions can include allow, block, bandwidth control, upload, email attachment, etc. The process 400 allows the creation of "sub-applications" under sanctioned or unsanctioned SaaS applications for granular access control policies based on the user's 102 identity, group, department, and/or location to these sub-applications only after explicit authorization is granted. The process 400 is general and can be extended to support any application, including numerous common enterprise productivity applications such as Office 365, Box, Dropbox, G Suite, AWS, and more. The process 400 can also be leveraged to provide required business authorization to consumer applications like YouTube. This tenancy restriction feature enables Organizations to have control over what tenants of applications their users can access.

The steps of the granular SaaS tenant restriction process 400 include obtaining a profile for an application, wherein the profile includes one or more tenants, rules for the use of the application by the one or more tenants, and users for the rules (step 402); monitoring a user of a tenant of the one or more tenants inline (step 404); identifying an application of the one or more applications based on the monitoring and associated rules for the user (step 406); and enforcing the associated rules for the user for the application (step 408).

The tenancy restriction is achieved in two ways. One way is to add custom headers in the traffic between the user 102 and the cloud applications 106. These custom headers (e.g., HTTPS) can be inserted in appropriate traffic with the value given by the administrator. That is, the traffic between the application and the node includes a header with information related to the application for the identifying. The other way is to parse the response body to figure out the information needed for enforcing the tenancy restriction. Here, the node is located between the user and the application, and wherein the identifying is based on a request from the user to the application monitored at the node, and a response from the application to the user monitored at the node.

The one or more applications can include Software-as-a-Service (SaaS) applications, such as, for example, Dropbox, Slack, Office 365, G Suite, etc. The one or more applications can include a video sharing application, such as YouTube, and wherein the associated rules include any of allowing or blocking channels and allowing or blocking content categories.

The monitoring can be via a Cloud Access Security Broker (CASB) service implemented through the cloud-based system. The monitoring can include inspection of encrypted traffic, e.g., SSL, by the node 150 between the user 102 and the cloud applications 106.

The tenant can be one of a plurality of tenants configured to operate with the cloud-based system, wherein, for a given application, the associated rules are different for at least two applications. Also, the rules can be used for a single user 102, for a group of users, for departments, locations, etc.

The steps can further include identifying a second application of the one or more applications based on the monitoring and associated rules for the user; and enforcing the associated rules for the user for the second application, wherein the associated rules for the second application are different from the associated rules for the first application. That is, the process 400 can be implemented for multiple applications for the same tenant, as well as the multiple applications for multiple tenants. That is, one application can have multiple tenants and one profile is for one application but can have multiple tenants.

Use Cases

The granular SaaS tenant restriction process 400 contemplates operation with various SaaS applications for file sharing, collaboration, social media, cloud computing, productivity, video sharing, and the like. The following description includes various use cases for SaaS applications with the granular SaaS tenant restriction process 400. Those skilled in the art will recognize these are presented for illustration purposes, and the granular SaaS tenant restriction process 400 contemplates additional SaaS applications not listed here.

Dropbox is a file-sharing SaaS and includes both an enterprise version and a personal version. The granular SaaS tenant restriction process 400 can control user access to both versions to control user access to Dropbox. In an embodiment, there can be multiple user profiles: one where users can access both Dropbox personal and Dropbox Enterprise accounts, one where users can access only Dropbox Enterprise, and one where users are restricted to a specific Dropbox Enterprise Team. These profiles control the access to Dropbox via a Web client and via the Dropbox Windows Desktop App. For Dropbox Enterprise accounts, the cloud-based system 100 can intercept the connection, including an HTTPS header with the "Team ID" value, with this value used to enforce restrictions. An organization can have multiple Enterprise Teams. Say there is one specific to M&A activities and only people involved in M&A will get access to that specific sub-region within Dropbox Enterprise Account.

For Slack, the tenancy restrictions can only be to allow company-specific workspaces to be accessible by their employees. For Facebook or other social media sites, the tenancy restrictions can differentiate a workplace from a personal space, e.g., allow Facebook Workplace, while blocking Personal Facebook. In certain cases, Facebook Personal can be allowed but under a limited bandwidth control rule.

For YouTube, the tenancy restrictions can only be to allow company-specific YouTube Channels Only. Customers want to allow only specific content on YouTube. They are not concerned that ads are delivered mid-stream. However, they do not want their employees to see inappropriate videos. Ideally, they would like to restrict to their own approved channels or content categories.

User Interface Screens

Figure 8:
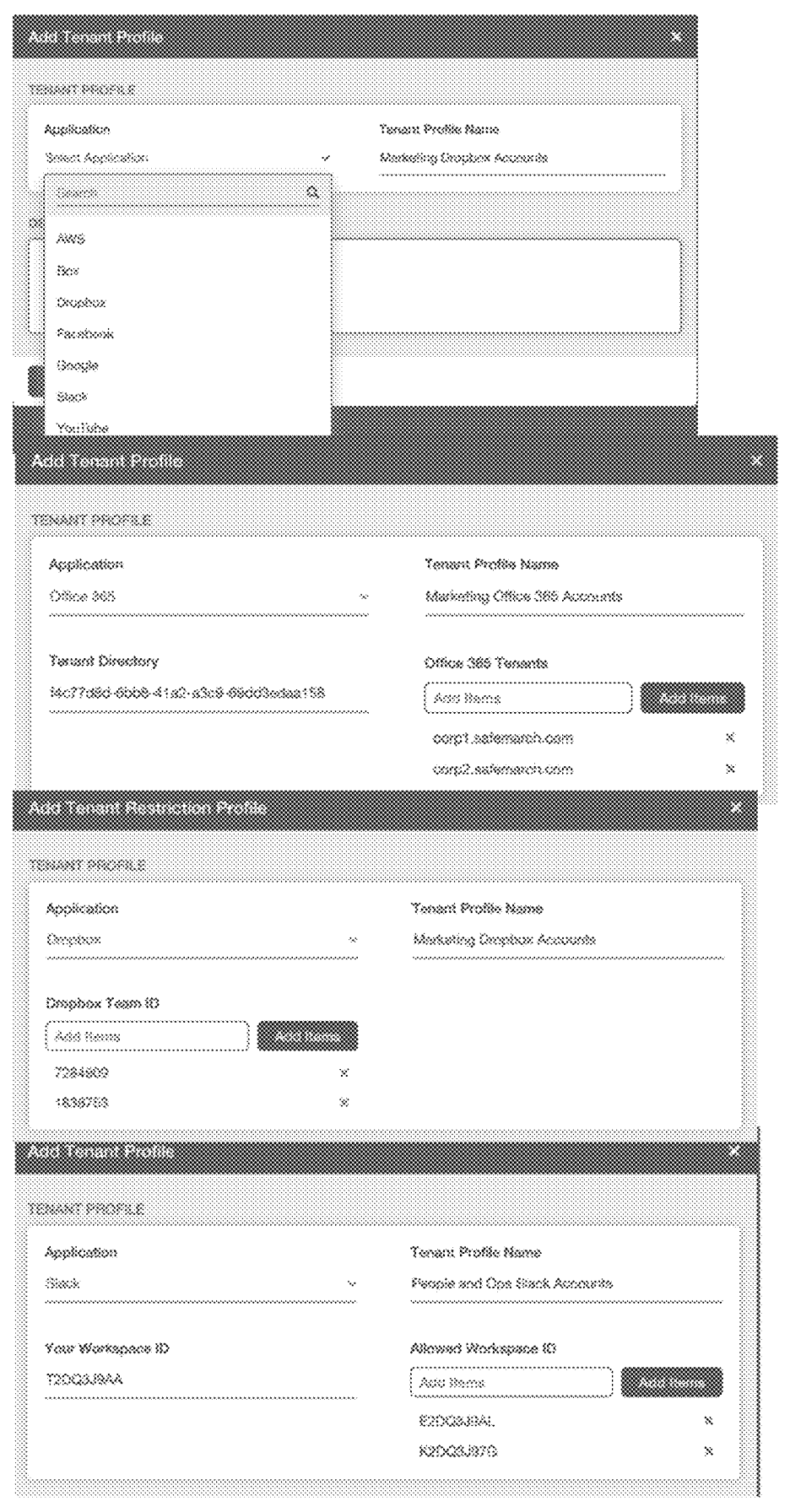
Figure 9:
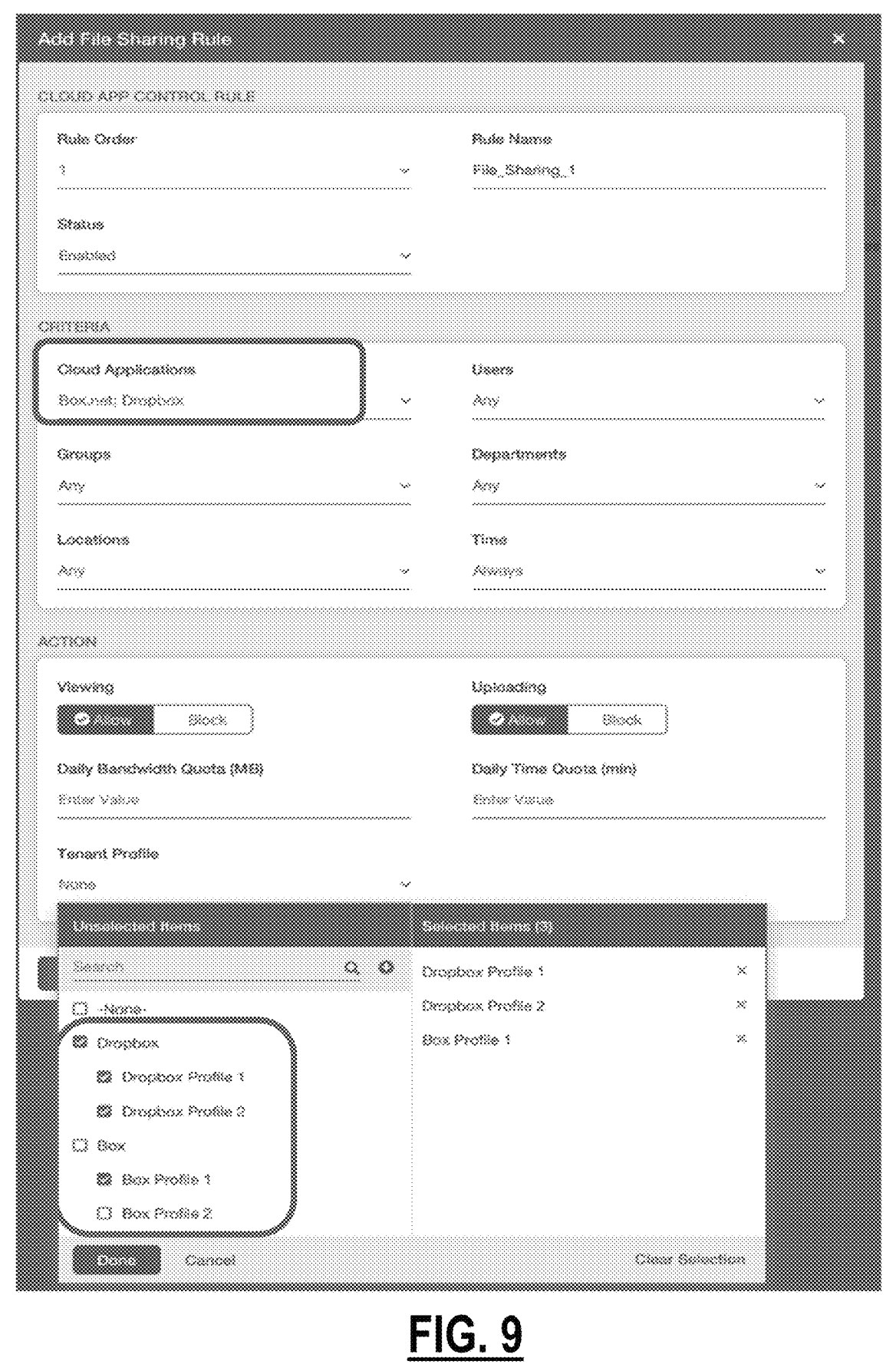
Figure 10:
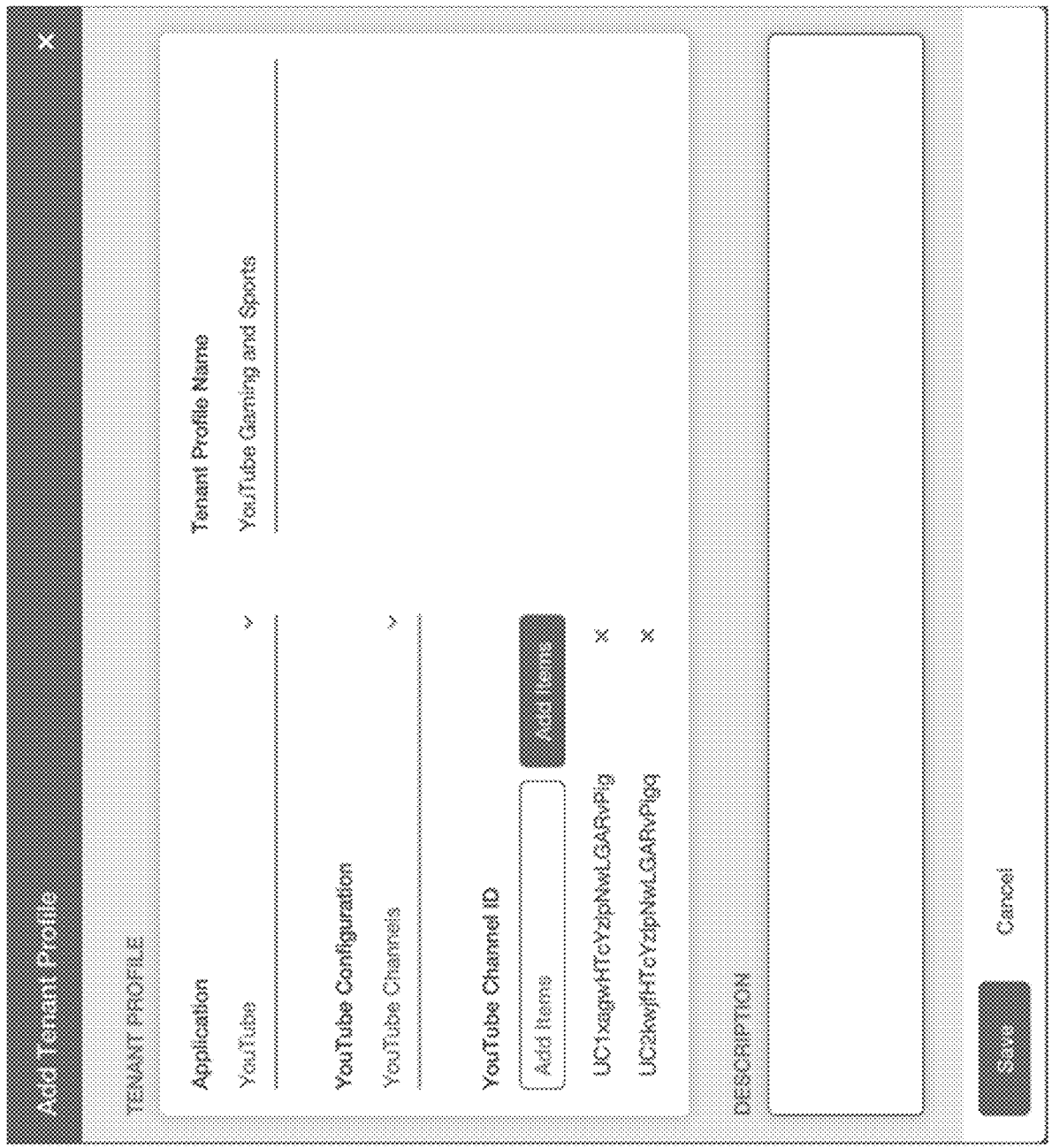
Figure 11:
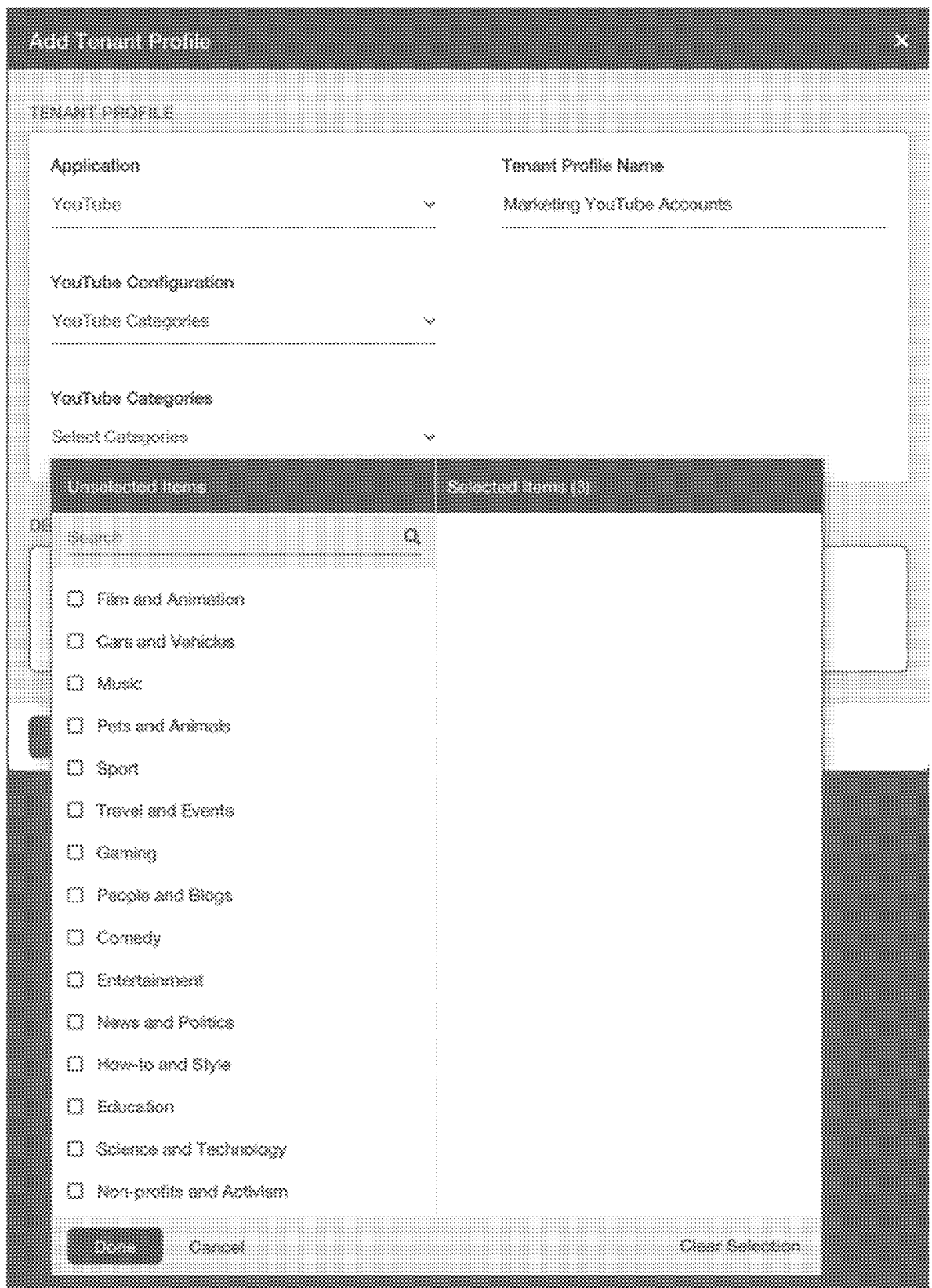

FIGS. 7-11 are screenshots associated with the granular SaaS tenant restriction process 400. FIG. 7 is a screenshot of a dashboard illustrating various tenant profiles for different cloud applications. From here, the administrator can add/delete/modify each profile. FIG. 8 is a screenshot of various windows for adding tenant profile rules, such as for AWS, Box, Dropbox, Facebook, Google, Slack, YouTube, etc. FIG. 9 is a screenshot of various windows for adding a file-sharing rule, such as through Dropbox. FIGS. 10 and 11 are screenshots of a window for a profile for YouTube. For video sharing, the tenancy restriction can be channel-based and/or content category-based.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a node in a cloud-based system to perform steps of:
   obtaining a profile for an application of one or more applications, wherein the profile includes one or more tenants, rules for use of the application by the one or more tenants, and users for the rules;
   monitoring a user of a tenant of the one or more tenants inline;
   identifying, based on the monitoring, the application, the user requesting to access the application, and associated rules for the user;
   creating a sub-application based on the identified application and the associated rules for the user, wherein the created sub-application includes specific sub-regions of the identified application; and
   enforcing the associated rules for the user for accessing the specific sub-regions of the identified application.

2. The non-transitory computer-readable storage medium of claim 1, wherein traffic between the application and the node includes a header with information related to the application for the identifying.

3. The non-transitory computer-readable storage medium of claim 1, wherein the node is located between the user and the application, and wherein the identifying is based on a request from the user to the application monitored at the node and a response from the application to the user monitored at the node.

4. The non-transitory computer-readable storage medium of claim 1, wherein the identified application is any of a social media application, a consumer application, and a Software-as-a-Service application, and wherein the steps further include limiting bandwidth to one or more of the specific sub-regions based on the associated rules.

5. The non-transitory computer-readable storage medium of claim 1, wherein the one or more applications include a video sharing application, and wherein the associated rules enforce access to specific sub-regions within the one or more applications including any of allowing or blocking channels and allowing or blocking content categories.

6. The non-transitory computer-readable storage medium of claim 1, wherein the monitoring is via a Cloud Access Security Broker (CASB) service implemented through the cloud-based system.

7. The non-transitory computer-readable storage medium of claim 1, wherein the monitoring includes inspection of encrypted traffic.

8. The non-transitory computer-readable storage medium of claim 1, wherein the tenant is one of a plurality of tenants configured to operate with the cloud-based system, wherein, for a given application, the associated rules are different for at least two tenants.

9. The non-transitory computer-readable storage medium of claim 1, wherein the application is a first application, and wherein the steps further include:
identifying a second application of the one or more applications based on the monitoring and associated rules for the user; and
enforcing the associated rules for the user for the second application, wherein the associated rules for the second application are different from the associated rules for the first application.

10. A method comprising:
obtaining a profile for an application of one or more applications, wherein the profile includes one or more tenants, rules for use of the application by the one or more tenants, and users for the rules;
monitoring a user of a tenant of the one or more tenants inline via a node in a cloud-based system;
identifying, based on the monitoring, the application, the user requesting to access the application, and associated rules for the user;
creating a sub-application based on the identified application and the associated rules for the user, wherein the created sub-application includes specific sub-regions of the identified application; and
enforcing the associated rules for the user for accessing the specific sub-regions of the identified application.

11. The method of claim 10, wherein traffic between the application and the node includes a header with information related to the application for the identifying.

12. The method of claim 10, wherein the node is located between the user and the application, and wherein the identifying is based on a request from the user to the application monitored at the node and a response from the application to the user monitored at the node.

13. The method of claim 10, wherein the identified application is any of a social media application, a consumer application, and a Software-as-a-Service application, and wherein the steps further include limiting bandwidth to one or more of the specific sub-regions based on the associated rules.

14. The method of claim 10, wherein the one or more applications include a video sharing application, and wherein the associated rules enforce access to specific sub-regions within the one or more applications including any of allowing or blocking channels and allowing or blocking content categories.

15. The method of claim 10, wherein the monitoring is via a Cloud Access Security Broker (CASB) service implemented through the cloud-based system.

16. The method of claim 10, wherein the monitoring includes inspection of encrypted traffic.

17. The method of claim 10, wherein the tenant is one of a plurality of tenants configured to operate with the cloud-based system, wherein, for a given application, the associated rules are different for at least two tenants.

18. The method of claim 10, wherein the application is a first application, and further comprising:
identifying a second application of the one or more applications based on the monitoring and associated rules for the user; and
enforcing the associated rules for the user for the second application, wherein the associated rules for the second application are different from the associated rules for the first application.

19. A node in a cloud-based system comprising:
one or more processors and memory comprising instructions that, when executed, cause the one or more processors to
obtain a profile for an application of one or more applications, wherein the profile includes one or more tenants, rules for use of the application by the one or more tenants, and users for the rules;
monitor a user of a tenant of the one or more tenants in line;
identify, based on the monitoring, the application, the user requesting to access the application, and associated rules for the user; and
create a sub-application based on the identified application and the associated rules for the user, wherein the created sub-application includes specific sub-regions of the identified application; and
enforce the associated rules for the user for accessing the specific sub-regions of the identified application.

20. The node of claim 19, wherein the tenant is one of a plurality of tenants configured to operate with the cloud-based system, wherein, for a given application, the associated rules are different for at least two tenants.

* * * * *